No. 777,647. Patented December 13, 1904.

UNITED STATES PATENT OFFICE.

JOHN WALTER, OF DETROIT, MICHIGAN.

IMITATION WOOD-CARVING.

SPECIFICATION forming part of Letters Patent No. 777,647, dated December 13, 1904.

Application filed February 29, 1904. Serial No. 195,903. (No specimens.)

*To all whom it may concern:*

Be it known that I, JOHN WALTER, a citizen of the United States of America, residing at Detroit, in the county of Wayne and State of Michigan, have invented certain new and useful Improvements in Imitation Wood-Carving, of which the following is a specification.

This invention relates to the plastic art of reproducing wood-carving in plastic material, and has particular reference to another concurrent invention for which I have filed an application for Letters Patent, Serial No. 195,904. In this last-mentioned application I have described the making of a mold of rubber by means of which I am enabled to reproduce from a wooden pattern a mold suitable to reproduce the article of plastic material with the minutest detail of the work, together with the grain of the wood itself.

The present application relates to a composition of matter and to certain treatment required after the article is cast in the mold to imitate the carving so closely that the eye could not tell the difference. To this end I first prepare the following composition: I take plaster-of-paris, or preferably what is known as "Keon" cement, and put such coloring-matter into it as will give it the exact color of the wood from which the pattern is made or which it is desired to have. Then I make this into a paste with the necessary amount of water in which previously dextrin has been dissolved to about forty per cent. of the weight of the water. This composition I pour into the rubber mold made from the wood-carving as described in the application referred to above and then while yet fluid reinforce the outer edges and back with Manila fiber. After the composition has set I take the article out of the mold and dry it in a temperature of about 100° Fahrenheit. After it is thoroughly dried I place the article into a heated solution composed of about thirty-five per cent. rosin, thirty per cent. linseed-oil, and thirty-five per cent. turpentine and heated to about 150° Fahrenheit and let the solution soak well into the article. I then take the article out and place it in an oven heated to about 200° Fahrenheit and let it remain until the solution has been completely absorbed. After taking it out of the oven the article is first given a coat of shellac, and, if desired, it is then treated with a wood-filler the same as wood is treated to enhance the color of the grain, and then finally the article is polished.

Having thus fully described my invention, what I claim is—

The herein-described process of manufacturing imitation wood-carvings from plastic material, which consists in bringing together into a mixture cement and water in which dextrin has been previously dissolved, then molding the mixture in a suitable mold made from the pattern, drying the molded article, then immersing it into a heated solution of rosin, turpentine and linseed-oil, then baking it in an oven, then giving it a coating of shellac and finally polishing it.

In testimony whereof I affix my signature in presence of two witnesses.

JOHN WALTER.

Witnesses:
SYLVIA TRILEK,
OTTO F. BARTHEL.